US006626310B2

(12) United States Patent  
Taha

(10) Patent No.: US 6,626,310 B2  
(45) Date of Patent: *Sep. 30, 2003

(54) CLOSURE WITH GAS BARRIER SEAL FOR A PRESSURIZED CONTAINER

(76) Inventor: Saad Taha, 5253 Plano Pkwy., Plano, TX (US) 75093

( * ) Notice: Subject to any disclaimer, the term of this patent is extended or adjusted under 35 U.S.C. 154(b) by 0 days.

This patent is subject to a terminal disclaimer.

(21) Appl. No.: 09/910,746

(22) Filed: Jul. 23, 2001

(65) Prior Publication Data

US 2002/0000420 A1 Jan. 3, 2002

Related U.S. Application Data

(63) Continuation-in-part of application No. 09/605,273, filed on Jun. 28, 2000, now Pat. No. 6,491,175.

(51) Int. Cl.[7] .............................. B65D 41/34
(52) U.S. Cl. ................ 215/252; 215/258; 215/344; 215/DIG. 1; 215/352; 215/354
(58) Field of Search .................. 215/252, 258, 215/329, 341, 343, 344, 352, 354, DIG. 1, 351, 380, 261; 220/288, 378

(56) References Cited

U.S. PATENT DOCUMENTS

| 1,910,913 | A |   | 5/1933  | Conner |   |
|-----------|---|---|---------|--------|---|
| 2,068,389 | A |   | 1/1937  | Smith  |   |
| 3,001,657 | A |   | 9/1961  | Gamble |   |
| 3,203,571 | A | * | 8/1965  | Plunkett | 215/344 |
| 3,224,617 | A | * | 12/1965 | Hohl et al. | 215/44 |
| 3,329,295 | A |   | 7/1967  | Fields |   |
| 3,441,161 | A |   | 4/1969  | Van Baarn |   |
| 3,536,224 | A | * | 10/1970 | Green | 215/344 |
| 3,933,308 | A | * | 1/1976  | Bradley et al. | 239/10 |
| 3,944,103 | A |   | 3/1976  | Cros |   |
| 4,033,472 | A |   | 7/1977  | Aichinger |   |
| 4,153,174 | A |   | 5/1979  | Keeler |   |
| 4,156,490 | A |   | 5/1979  | Peraboni |   |
| 4,196,818 | A | * | 4/1980  | Brownbill | 215/252 |

(List continued on next page.)

FOREIGN PATENT DOCUMENTS

| DE | 79 33 540 |   | 4/1980 |
|----|-----------|---|--------|
| EP | 0008190 |   | 2/1980 |
| EP | 0117104 |   | 8/1984 |
| EP | 0390412 |   | 10/1990 |
| EP | 635434 A1 |   | 1/1995 |
| GB | 1054308 |   | 1/1967 |
| GB | 2039817 |   | 8/1980 |
| JP | 5674445 |   | 6/1981 |
| JP | 2002-19818 | * | 1/2002 |
| WO | WO9414673 |   | 7/1994 |
| WO | WO9624532 |   | 8/1996 |
| WO | WO 00 10888 A1 |   | 3/2000 |
| WO | WO 00 34133 A3 |   | 6/2000 |

*Primary Examiner*—Robin A. Hylton  
(74) *Attorney, Agent, or Firm*—Christopher J. Rourk; Akin Gump Strauss Hauer & Feld, LLP

(57) ABSTRACT

A closure for connection to a container with a threaded neck portion includes an upper wall with a lower surface and a skirt formed integrally with and extending generally downwardly from the upper wall. An internal helical thread is formed on an inner surface of the skirt for engaging the threaded neck portion to thereby secure the closure to the container. An inner annular seal extends generally axially downwardly from the upper wall to sealingly engage an inner surface of the neck portion. The inner annular seal has an inner seal apex area and a downwardly sloped surface extending generally downwardly and away from the upper wall to the inner seal apex area. A gas barrier seal has an annular sealing bead positioned between the inner seal apex area and the upper wall inner surface for sealingly engaging the inner surface of the neck portion. The downwardly sloped surface of the inner annular seal holds the annular sealing bead at least adjacent the lower surface of the upper wall. An oxygen absorbing liner can also be connected to the upper wall.

2 Claims, 8 Drawing Sheets

U.S. PATENT DOCUMENTS

| | | | |
|---|---|---|---|
| 4,206,851 A | 6/1980 | Ostrowsky | |
| 4,206,852 A | 6/1980 | Dunn et al. | |
| 4,331,249 A | 5/1982 | Banich, Sr. | |
| 4,343,408 A | 8/1982 | Csaszar | |
| 4,418,828 A | 12/1983 | Wilde et al. | |
| 4,470,513 A | 9/1984 | Ostrowsky | |
| 4,478,343 A | 10/1984 | Ostrowsky | |
| 4,488,655 A | 12/1984 | Itsubo et al. | |
| 4,489,845 A | 12/1984 | Aichinger et al. | |
| 4,546,892 A | 10/1985 | Couput | |
| 4,550,844 A | 11/1985 | Lininger | |
| 4,560,077 A | 12/1985 | Dutt | |
| 4,564,112 A | 1/1986 | Breuer | |
| 4,567,993 A | 2/1986 | Albrecht et al. | |
| 4,576,299 A * | 3/1986 | Lecinski, Jr. | 215/318 |
| 4,640,428 A * | 2/1987 | Chang | 215/351 |
| 4,664,279 A * | 5/1987 | Obrist et al. | 215/252 |
| 4,700,860 A * | 10/1987 | Li | 215/341 |
| 4,756,436 A | 7/1988 | Morita et al. | |
| 4,785,952 A | 11/1988 | Obadia | |
| RE32,879 E | 2/1989 | Wright et al. | |
| 4,840,280 A | 6/1989 | Schvester | |
| RE33,265 E | 7/1990 | Gregory et al. | |
| 4,978,016 A | 12/1990 | Hayes | |
| 4,981,230 A | 1/1991 | Marshall et al. | |
| 5,074,425 A * | 12/1991 | Wustmann et al. | 215/252 |
| 5,143,763 A | 9/1992 | Yamada et al. | |
| 5,239,016 A | 8/1993 | Cochran et al. | |
| 5,282,540 A | 2/1994 | Beck | |
| 5,328,044 A | 7/1994 | Röhrs et al. | |
| 5,381,914 A | 1/1995 | Koyama et al. | |
| 5,400,913 A | 3/1995 | Kelly | |
| 5,465,858 A | 11/1995 | Gargione | |
| 5,542,557 A | 8/1996 | Koyama et al. | |
| 5,570,798 A | 11/1996 | Hayashida et al. | |
| 5,609,263 A | 3/1997 | Perchepied | |
| 5,673,809 A | 10/1997 | Ohmi et al. | |
| 5,676,269 A | 10/1997 | Blake et al. | |
| 5,727,705 A | 3/1998 | Kelly | |
| 5,785,196 A | 7/1998 | Montgomery | |
| 5,839,593 A | 11/1998 | McKedy | |
| 5,875,909 A * | 3/1999 | Guglielmini | 215/350 |
| 5,934,494 A | 8/1999 | Takahashi et al. | |
| 5,972,452 A | 10/1999 | Takahashi et al. | |
| 6,006,930 A | 12/1999 | Dreyer et al. | |
| 6,194,042 B1 | 2/2001 | Finkelstein et al. | |
| 6,338,414 B1 * | 1/2002 | Schellenbach | 215/252 |
| 6,491,175 B1 * | 12/2002 | Taha | 215/252 |

\* cited by examiner

US 6,626,310 B2

CLOSURE WITH GAS BARRIER SEAL FOR A PRESSURIZED CONTAINER

CROSS REFERENCE TO RELATED APPLICATIONS

This application is a Continuation-in-Part of U.S. patent application Ser. No. 09/605,273 filed on Jun. 28, 2000 is now U.S. Pat. No. 6,491,175, the disclosure of which is hereby incorporated by reference.

BACKGROUND OF THE INVENTION

1. Field of the Invention

This invention relates in general to container closures, and more particularly to a container closure having multiple sealing surfaces and a tamper-evident ring.

2. Description of the Related Art

Various tamper-evident closures have been proposed wherein a threaded cap has a skirt portion with internal threads for connecting the cap to the threaded neck of a container. A security ring is typically formed during molding of the cap and frangible connections are formed after molding by cutting or slitting openings into the closure at the juncture of the security ring and skirt portion. The security ring may be provided with a plurality of circumferentially spaced, inwardly and upwardly extending tabs or fingers integrally connected to the ring. The outer free ends of the fingers are adapted to engage beneath a shoulder or ledge on the container neck below the threaded portion. In this manner, the cap is prevented from being removed from the container until twisted a sufficient distance to break the frangible connection and thereby separate the cap from the ring.

Closures of the above-mentioned type are typically manufactured with medium or high density polyethylene materials through die casting or thermoforming. The materials must be sufficiently resilient and flexible to enable extraction of the male die member from the cavity of the closure despite the presence of the inwardly and upwardly extending fingers. Since the closures are anchored to the container mainly by engagement of the fingers with the shoulder or ledge, the required flexibility and resilience of the closure to enable separation from the die may also enable the closure to be relatively easily removed from the container without breaking the frangible connection between the skirt and the security ring by slipping the closure off the container in a direction parallel with the axis of the container neck. This is particularly disadvantageous since there is no clear indication that the container has been tampered with.

In recognition of this problem, UK Patent Application No. GB 2 039 817 proposes die molding a closure out of relatively rigid plastics material, such as polypropylene. However, the die-molding process itself is relatively time consuming and therefore contributes to an increase in the cost of manufacturing the closure. In addition, the formation of frangible bridges requires a further processing step wherein openings between the bridges are cut or slit at the intersection of the security ring and skirt portion of the closure. The extra processing step requires extra equipment, time, and energy and thereby contributes to the overall cost of the closure.

Other closures are formed in a single piece. As desirable as the one-piece plastic closure may be, there are a number of problems associated with its use. For example, it is difficult to maintain a seal between the closure and container over an extended period of time under various conditions of packing, storing and handling. Once the closure is firmly engaged on the container, whether by threads or some other means, various parts of the closure are under stress because of forces required to effect a seal. These stresses tend to cause cold flow or creep of the closure material and may cause a breach in the seal between the closure and container. This tendency is augmented when the closure and container are subject to internal pressure from carbonated beverages. A plastic material's tendency to creep is further affected by elevated temperatures, which may result in a breach of the seal and consequential leakage and/or spoilage of the contents.

Even when the closure is sufficient to retain the beverage in a carbonated state, removal of the closure for dispersing the beverage causes seal degradation to the point where the closure cannot retain its prior sealing ability. Consequently, the beverage will lose much of its carbonation in a relatively short period of time and is often discarded before being completely consumed.

Other closure designs depend on adding a different sealing material on the bottom surface of the closure top wall to maintain a seal between the closure and an upper edge of a neck portion of the container. Such designs, which are often used when the beverage in the container is in a carbonated state, frequently require the application of adhesive material or some other bonding means to bond the different sealing material to the bottom surface of the closure top wall. The use of such bonding means requires more steps in manufacturing and assembly, and it also contributes to an increase in closure manufacturing costs. In addition, the adhesive or other bonding material can deteriorate over time, causing the different sealing material to fall out of the closure. Further, the closure must be completely and firmly engaged on the container in order for such a seal to be fully effective.

Moreover, many closure designs fail to address the problems associated with the storage of beverages containing oxygen or oxygen-producing contents, such as found in some alcohol-based beverages. The presence or production of oxygen can lead to spoilage of the beverage or and a shorter shelf life than beverages without the oxygen content.

In addition to the above drawbacks, the internal threads in prior art closures are typically symmetrical in cross section. Although this construction may facilitate attachment of the closure to the container, the internal threads may not properly seal against the external threads of the container. Moreover, the molding process for closures with threads of this nature typically requires the core mold to be rotated or unscrewed from the interior of the closure after closure formation. This is a time consuming process and is much less efficient than if the core mold were to be withdrawn from the formed closure without rotation.

SUMMARY OF THE INVENTION

According to the invention, a closure is provided for connection to a container. The container typically has a neck portion and an external helical thread formed on an outer surface of the neck portion. The closure comprises an upper wall with a lower surface and a skirt formed integrally with and extending generally downwardly from the upper wall. The skirt has a skirt inner surface with an internal helical thread formed thereon for engaging the external helical thread of the neck portion to thereby secure the closure to the container. An inner annular seal extends generally axially downwardly from the upper wall to sealingly engage an inner surface of the neck portion. The inner annular seal has an inner seal apex area and a downwardly sloped surface extending generally downwardly and away from the upper wall to the inner seal apex area. A gas barrier seal has an annular sealing bead positioned between the inner seal apex area and the upper wall inner surface for sealingly engaging the inner surface of the neck portion. The downwardly sloped surface of the inner annular seal holds the annular sealing bead at least adjacent the lower surface of the upper wall.

Further according to the invention, a closure is provided for connection to a container with a neck portion, an annular shoulder and an external helical thread formed on an outer surface of the neck portion above the shoulder. The closure comprises an upper wall including a lower surface and a skirt formed integrally with and extending generally downwardly from the upper wall. The skirt has a skirt inner surface with an internal helical thread formed thereon for engaging the external helical thread of the neck portion to thereby secure the closure to the container. The internal helical thread comprises a crown spaced from the skirt inner surface, an upper thread surface extending generally upwardly and away from the crown to the skirt inner surface, and a lower thread surface extending generally downwardly and away from the crown to the skirt inner surface. A length of the upper thread surface is greater than a length of the lower thread surface to thereby form an asymmetrical cross sectional thread shape. The upper thread surface is adapted to sealingly engage a lower surface of the external helical thread when the closure is installed on the neck portion. An outer annular seal is formed on the inner skirt surface and extends generally radially inwardly toward a central axis of the closure for sealingly engaging the outer surface of the neck portion. An inner annular seal extends generally axially downwardly from the upper wall to sealingly engage an inner surface of the neck portion. The inner annular seal has an inner seal apex area and a downwardly sloped surface. The downwardly sloped surface extends generally downwardly and away from the upper wall to the inner seal apex area. A thickness of the neck portion between the inner and outer annular seals is greater than a distance between the inner and outer annular seals before installation of the closure on the container. The outer annular seal exerts inward radial pressure on the outer surface of the neck portion and the inner annular seal exerts outward radial pressure on the inner surface of the neck portion when the closure is installed on the container. A gas barrier seal is constructed of an elastomer material and comprises an annular sealing bead integrally formed with an annular sealing flange. The annular sealing flange extends generally radially outwardly from the annular sealing bead. The annular sealing bead is positioned between the inner seal apex area and the lower surface of the upper wall for sealingly engaging the inner surface of the neck portion. The downwardly sloped surface holds the annular sealing bead at least adjacent the lower surface of the upper wall. The annular sealing flange has an outside edge positioned near the skirt inner surface and above the upper surface of the outer annular seal. An upper surface of the outer annular seal is adapted to hold the annular sealing flange at least adjacent the lower surface of the upper wall. A tamper-evident security ring is connected to a lower end of the skirt. The security ring comprises an annular wall, and a plurality of circumferentially spaced retaining tabs having a first end resiliently connected to the annular wall through an integral hinge and a second free end extending away from the integral hinge toward a central axis of the closure. Installation of the closure on the neck portion causes the retaining tabs to elastically deflect toward the annular wall when the second free ends pass by the shoulder. The second free ends are adapted to bias against the outer surface of the neck portion below the annular shoulder when the closure is installed on the neck portion.

These and other features and advantages of the invention will become apparent upon reference to the following detailed description and the accompanying drawings.

BRIEF DESCRIPTION OF THE DRAWINGS

The preferred embodiments of the present invention will hereinafter be described in conjunction with the appended drawings wherein.

Figure 1:
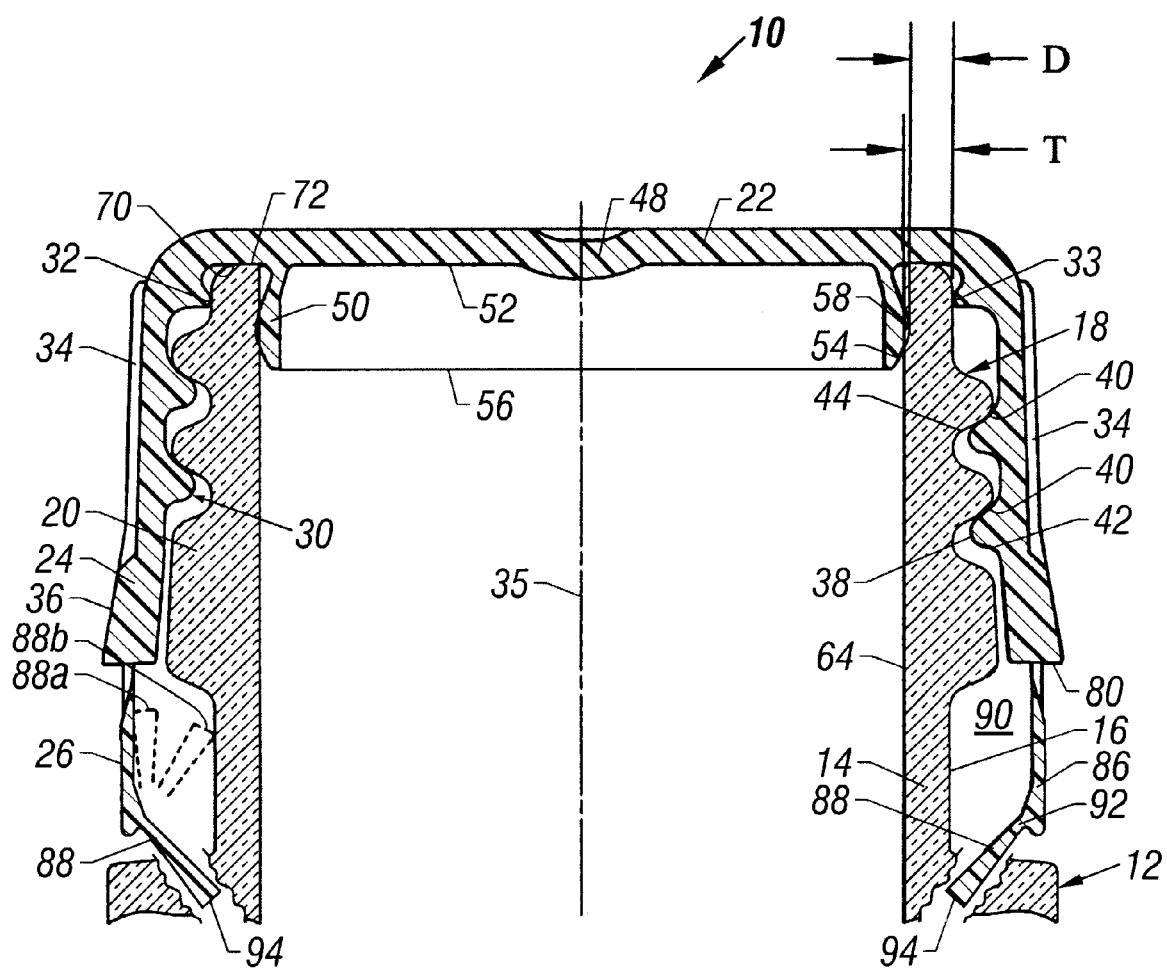
FIG. 1 is an enlarged cross sectional view of a container closure according to the invention mounted on the neck of a container.
Figure 2:
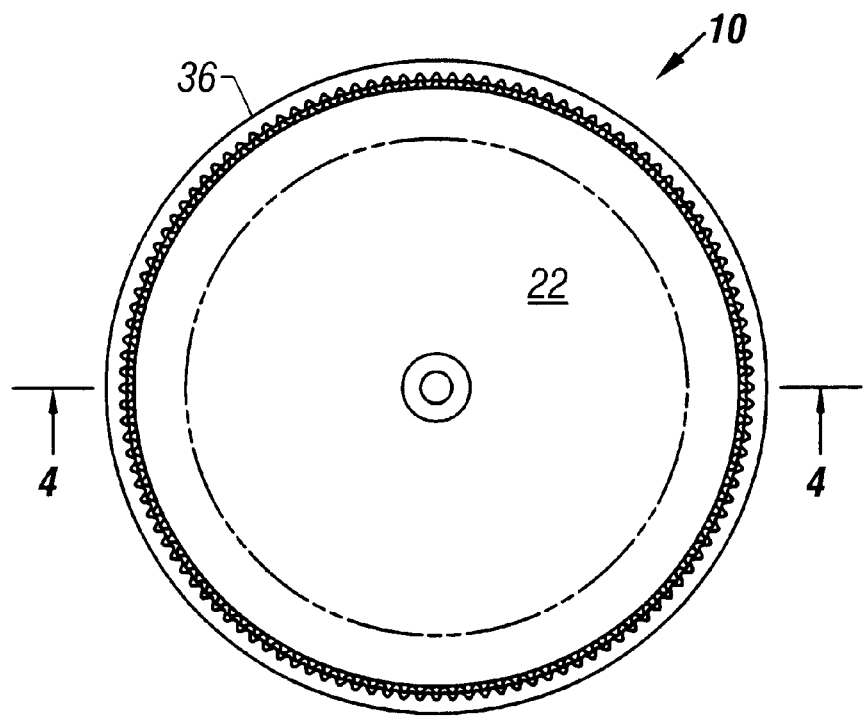
FIG. 2 is a top plan view of a container closure according to the invention.

It is noted that the drawings are intended to represent only typical embodiments of the invention and therefore should not be construed as limiting the scope thereof. The invention will now be described in greater detail with reference to the drawings, wherein like parts throughout the drawing figures are represented by like numerals.

DETAILED DESCRIPTION OF THE PREFERRED EMBODIMENTS

Referring now to the drawings, and to FIG. 1 in particular, an exemplary embodiment of a closure 10 for connection to a container 12 is illustrated. An upper end of the container 12 includes a neck portion 14 with an external helical thread 18 and an annular shoulder 20 formed on an outer surface 16 thereof. As shown, the shoulder 20 is located below the thread 18 in a well known arrangement.

The closure 10 includes an upper wall 22 and a skirt 24 that is integrally formed with and extends downwardly from the upper wall. The skirt 24 is generally cylindrical in shape but may be conical or of some other shape in order to accommodate the shape of the neck portion 14. As shown, the skirt is preferably flared to facilitate removal of the closure from a mold (not shown) after a molding operation, and to facilitate installation of the closure on the neck of a container.

A tamper-evident security ring 26 may be frangibly connected to a lower end of the skirt 24. The closure 10, including the upper wall, skirt and security ring 26, is preferably integrally formed from a relative stiff plastic material, such as polypropylene, through injection molding, although other known forming processes may be used.

With additional reference to FIGS. 2 through 5, the skirt 24 includes an inner surface 28 with an internal helical thread 30 formed thereon for engaging the external helical thread 18 of the neck portion 14 when the closure 10 is installed on the container 12. An outer annular seal 32 is formed integral with the inner surface 28 and extends generally radially inwardly toward a central axis 35 of the closure 10. An apex area 33 of the outer annular seal 32 is adapted to sealingly engage the outer surface 16 of the neck portion 14 above the external thread 18. A plurality of ribs 34 are formed on an outer surface 36 of the skirt 24 to enhance gripping of the closure by a user. A series of grooves or channels 37 and ribs 39 are formed on the inner surface 28 of a lower end of the skirt 24 between the internal helical thread 30 and a lower surface or shoulder 80 of the skirt. The grooves 37 lighten the weight of the closure 10 while the ribs 39 provide structural strength to the closure. As shown, the lower end of the skirt is preferably flared to facilitate removal of the closure from a mold (not shown) after a molding operation, and to facilitate installation of the closure on the neck of a container.

Figure 8:
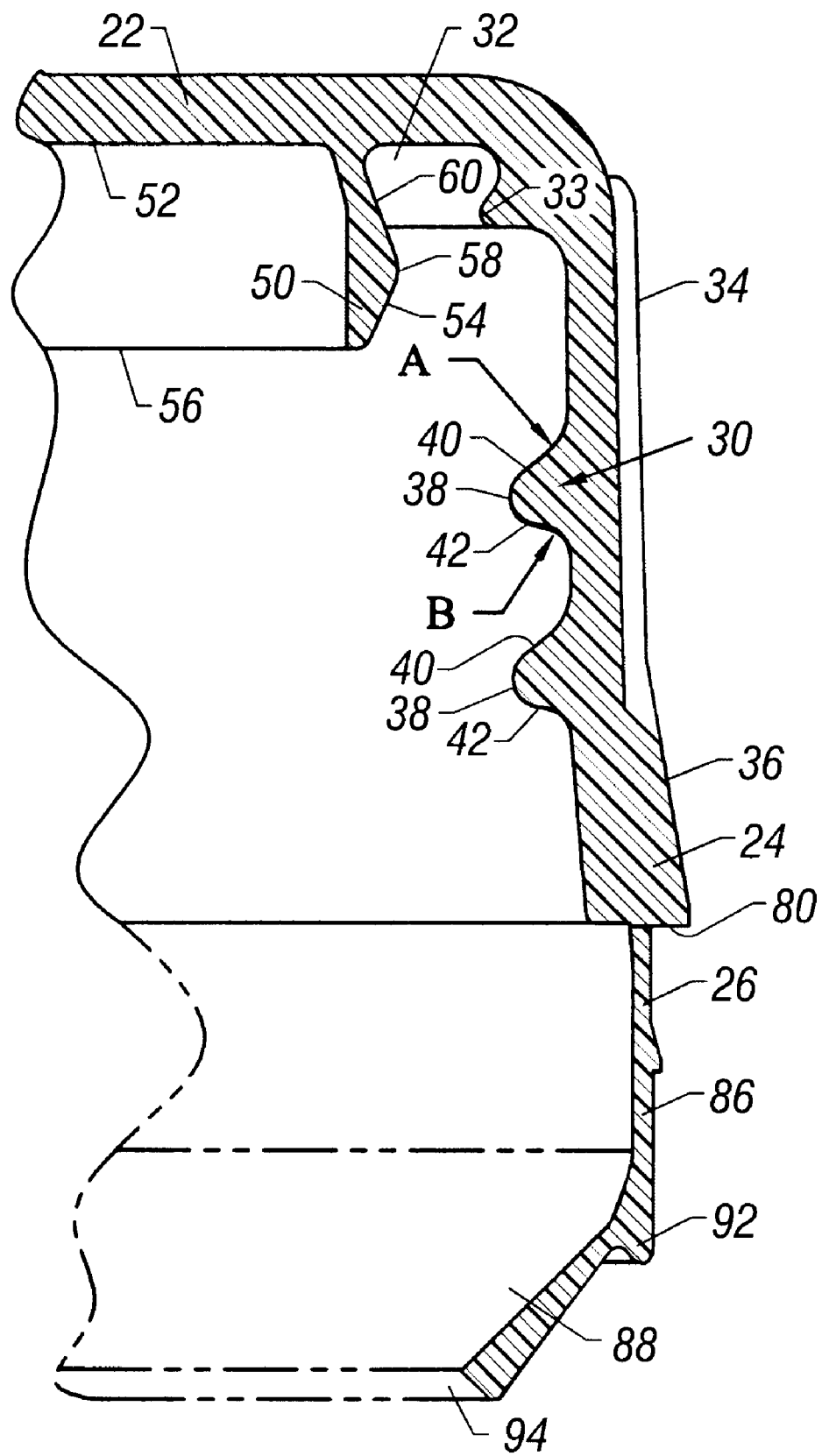
FIG. 8 is an enlarged cross sectional view of a portion of the container closure illustrating the thread and seal details.

With reference now to FIG. 8, the internal helical thread 30 includes a crown 38 integrally formed with an upper curved surface 40 with a first radius A and a lower curved surface 42 with a second radius B that is different from the first radius A to thereby form an internal thread that is asymmetrical in cross section. Preferably, the first radius A is greater than the second radius B. This arrangement is especially advantageous during the molding process. The upper curved surface of the internal thread 30 and the corresponding mold or core surface (not shown) facilitate removal of the core from the interior of the closure in a linear direction parallel with the closure central axis 35 without stripping the internal thread 30. This feature greatly increases the closure production rate and decreases mold costs over the prior art where the core must be rotated out of the closure interior. Linear removal of the core is preferably accomplished while the material is still warm, but after it is set in the mold. The lower surface or shoulder 80 of the skirt may be in contact with a movable mold section during the molding process so that the closure 10 may be linearly ejected from the core mold.

The asymmetric cross sectional shape of the internal thread 30 also allows for greater variation in container tolerance and external thread shape since more surface area on the upper surface 40 is available for contacting a lower surface 44 (FIG. 1) of the external thread 18 on the neck portion 14 when the closure 10 is attached to the neck portion. As shown in FIG. 1, the upper surface 40 of the internal thread 30 may be different in curvature or slope than the lower surface 44 of the external thread 18 to accommodate a wide variety of external thread shapes and tolerances. The asymmetric cross sectional shape of the internal thread 30 assures that full contact is maintained between the external thread 18 of the neck portion 14 and the internal thread 30. This feature minimizes the deformation that may occur due to a rise in pressure in the container 12.

Figure 6:
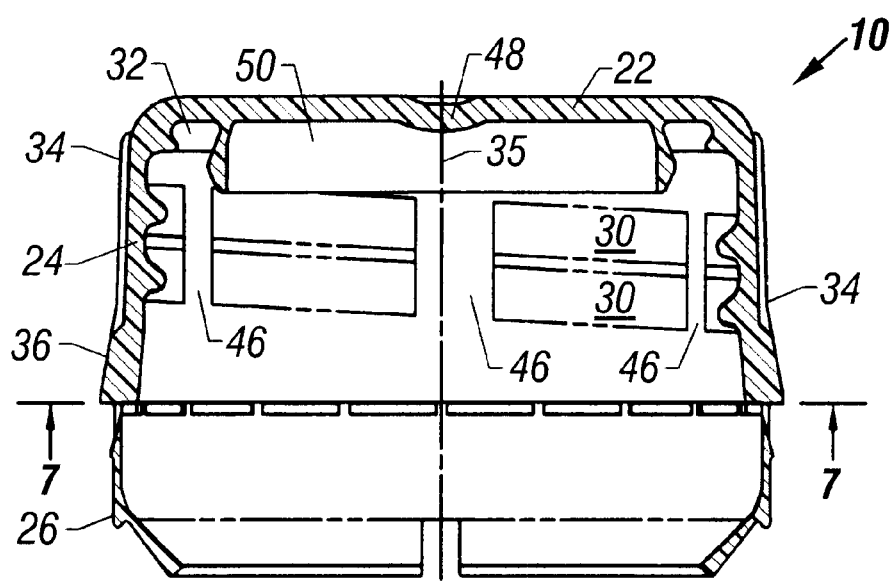
FIG. 6 is a cross sectional view similar to FIG. 4 of a container closure according to a further embodiment of the invention.
Figure 7:
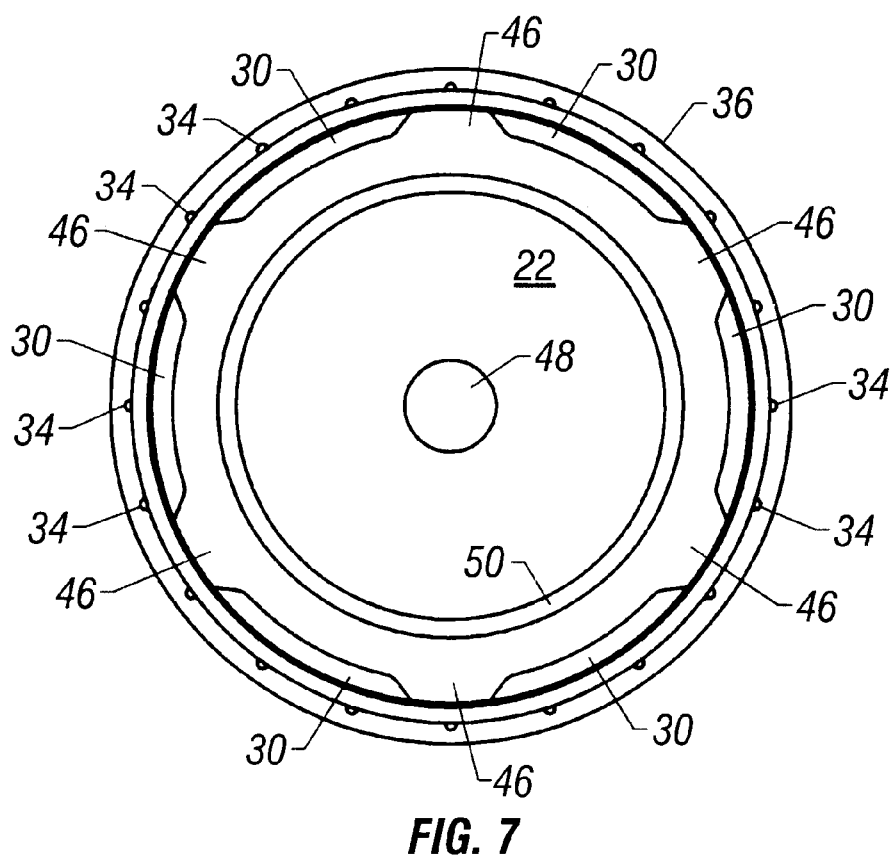
FIG. 7 is a cross sectional view of the container closure taken along line 7—7 of FIG. 6.

As shown in FIGS. 6 and 7, and according to a further embodiment of the invention, the internal helical thread 30 may be interrupted by circumferentially spaced vent slots 46. The number of vent slots 46 preferably match the number of vent slots (not shown) extending through the external helical thread 18 of the neck portion 14 when so equipped. The vent slots 46 are normally out of alignment with the vent slots of the container when the closure 10 is fully seated to thereby enhance the maximum pressure to which the closure 10 can be exposed without bursting or leaking. In a preferred embodiment, the closure 10 is designed to withstand pressures of about 175 psi or more. This embodiment is especially suitable for carbonated beverage containers, since initial twisting of the closure will cause the vents in the closure and container to at least partially align and release any pressure within the container before the internal and external threads are disengaged.

Referring now to FIGS. 1, 3, 4 and 8, the upper wall 22 includes a depression 48 formed therein and an inner annular seal 50 formed on a lower surface 52 of the upper wall 22. The depression 48 is coincident with an injection port of an injection molding machine (not shown) during formation of the closure 10. Where other molding processes are used, the depression 48 may be eliminated. The inner annular seal 50 extends in a generally axial direction and includes an upwardly sloped surface 54 that extends outwardly and upwardly from a lower edge 56 to a seal apex area 58 and a downwardly sloped surface 60 that extends outwardly and downwardly from the lower surface 52 of the upper wall 22 to the seal apex area 58. The apex area 58 of the inner annular seal 50 is adapted to sealingly engage the inner surface 64 of the neck portion 14 above the external thread 18. Preferably, the distance "D" between the apex area 33 of the outer annular seal 32 and the apex area 58 of the inner annular seal 50 is less than the thickness "T" of the neck portion 14 between the apex areas, as shown in FIG. 1. In this manner, the outer and inner annular seals are biased tightly against the neck 14 and create a double seal between the closure 10 and container 12. An upper annular seal 70 is provided by the bottom surface 52 of the upper wall 22 between the outer and inner annular seals 32, 50. The upper annular seal 70 is in sealing engagement with an upper edge 72 of the neck portion 14 when the closure is completely installed on the container.

With this arrangement, the contents within the container 12 are isolated from the atmosphere outside the container by three separate annular seals. The shape of the annular seals creates a positive sealing engagement with the neck portion 14 without excessive friction that would otherwise require additional torque to open and close the container 12. The provision of three seals is especially advantageous when the container and closure are subjected to internal pressure, such as when a carbonated beverage is located in the container. Under internal pressure, the upper wall will tend to bow outwardly, which in turn will cause the outer annular seal 32 to increase its contact pressure with the outer surface 16 of the neck portion 14. Concurrently, the contact pressure between the inner annular seal 50 and the inner surface 64 of the neck portion 14 will increase. In addition, the multiplicity of annular seals (besides the sealing engagement between the internal and external threads) assures that the contents of the container will remain sealed even if one or two of the annular seals were to fail. In this manner, carbonated beverages can maintain their carbonation for longer periods of time than prior art closures, even when the closure 10 of the present invention has been removed and reinstalled on the container.

Figure 3:
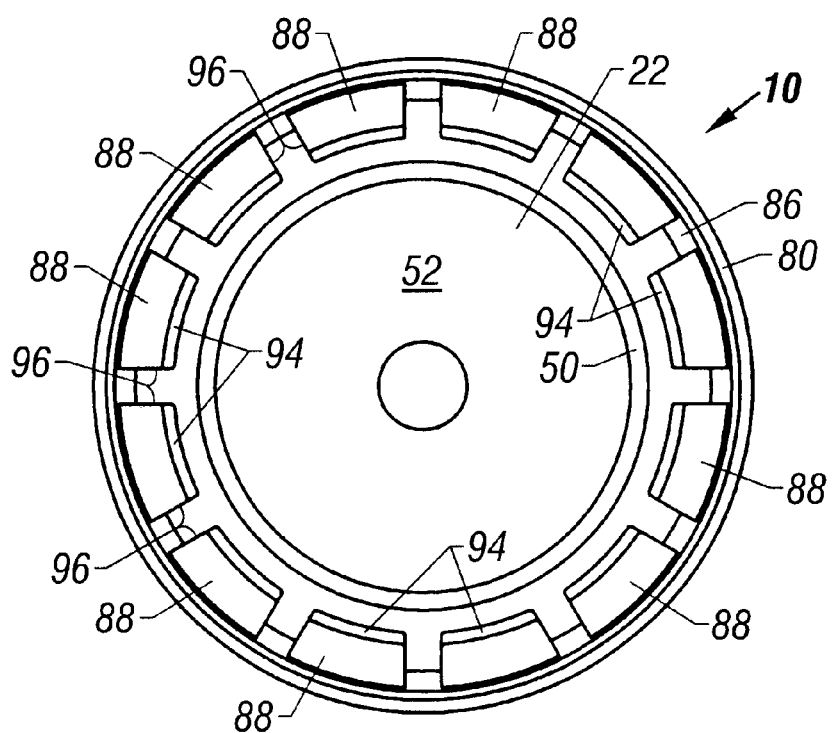
FIG. 3 is a bottom plan view of the container closure.
Figure 4:
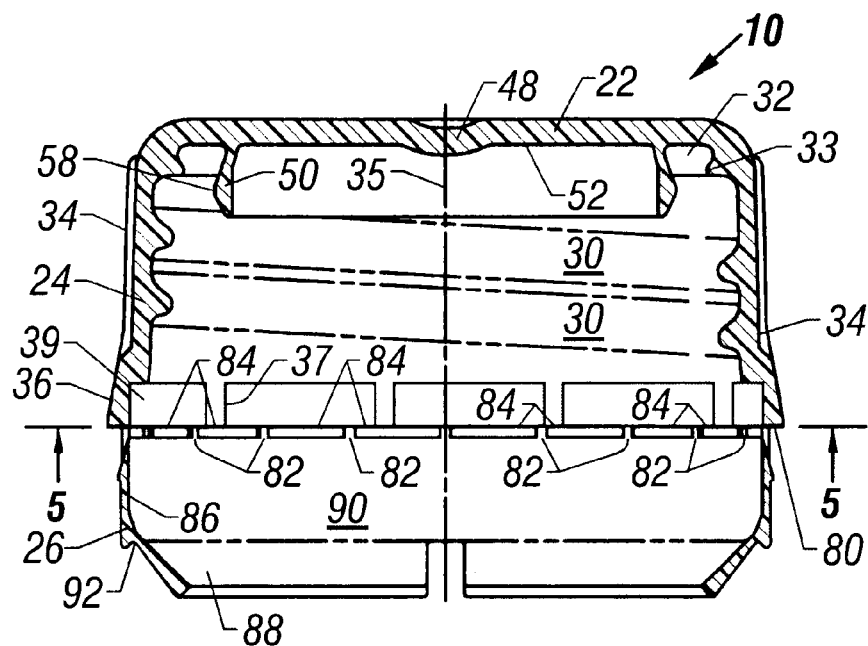
FIG. 4 is a cross sectional view of the container closure taken along line 4—4 of FIG. 2.
Figure 5:
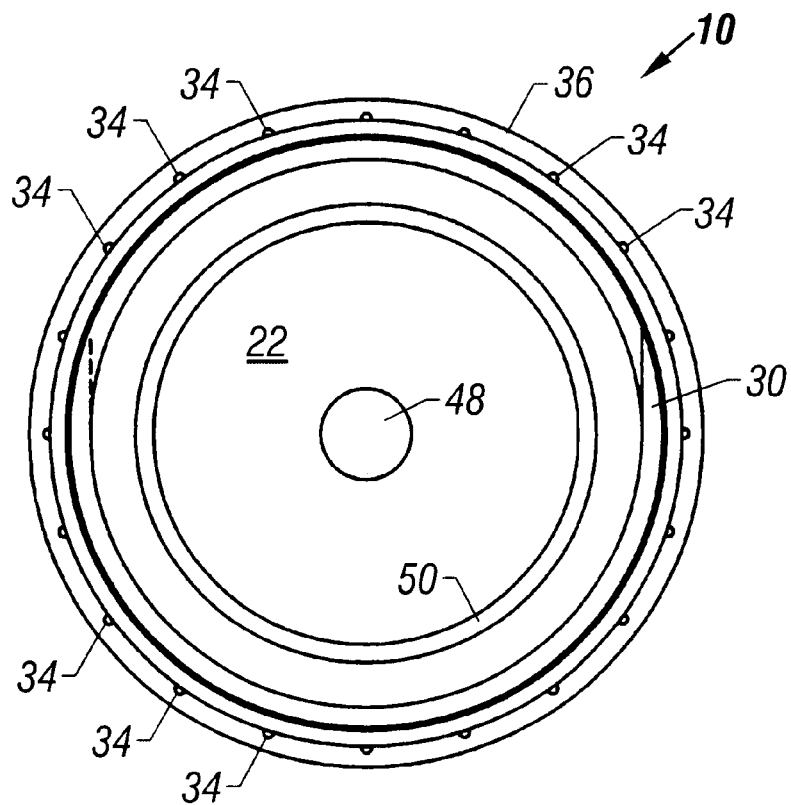
FIG. 5 is a cross sectional view of the container closure taken along line 5—5 of FIG. 4.

As shown most clearly in FIGS. 1, 3, 4 and 8, the security ring 26 is connected to a lower surface 80 of the skirt 24 through circumferentially spaced ribs 82 that are separated by windows or slots 84. The ribs 82 are preferably of sufficient thickness and width to resist forces that may occur during installation of the closure 10 on the container 12. The security ring 26 includes an annular wall 86 and a plurality of circumferentially spaced retaining tabs 88 connected to an inner surface 90 of the annular wall through integral hinges 92. When formed, the tabs 88 preferably initially extend at an obtuse angle with respect to the annular wall 86 to facilitate removal of the core mold. A subsequent forming operation may include bending the tabs 88 to form a perpendicular or acute angle with the annular wall 86 by pressing a mandrel or the like against the tabs until they are plastically deformed to the desired position. In this manner, less force is required to install the closure 10 on the container 12. The tabs 88 as shown in FIG. 8 gradually increase in thickness from the integral hinge 92 to an outer free end 94 thereof. Alternatively, the tabs may be of constant or decreasing thickness. As shown in FIG. 3, the outer free ends 94 of the tabs 88 are concave. In a further embodiment, the outer free ends may be straight or convex. Moreover, although the tabs are shown as separate from each other, they may be joined at their radially extending edges 96 through a flexible web or the like.

Figure 9:
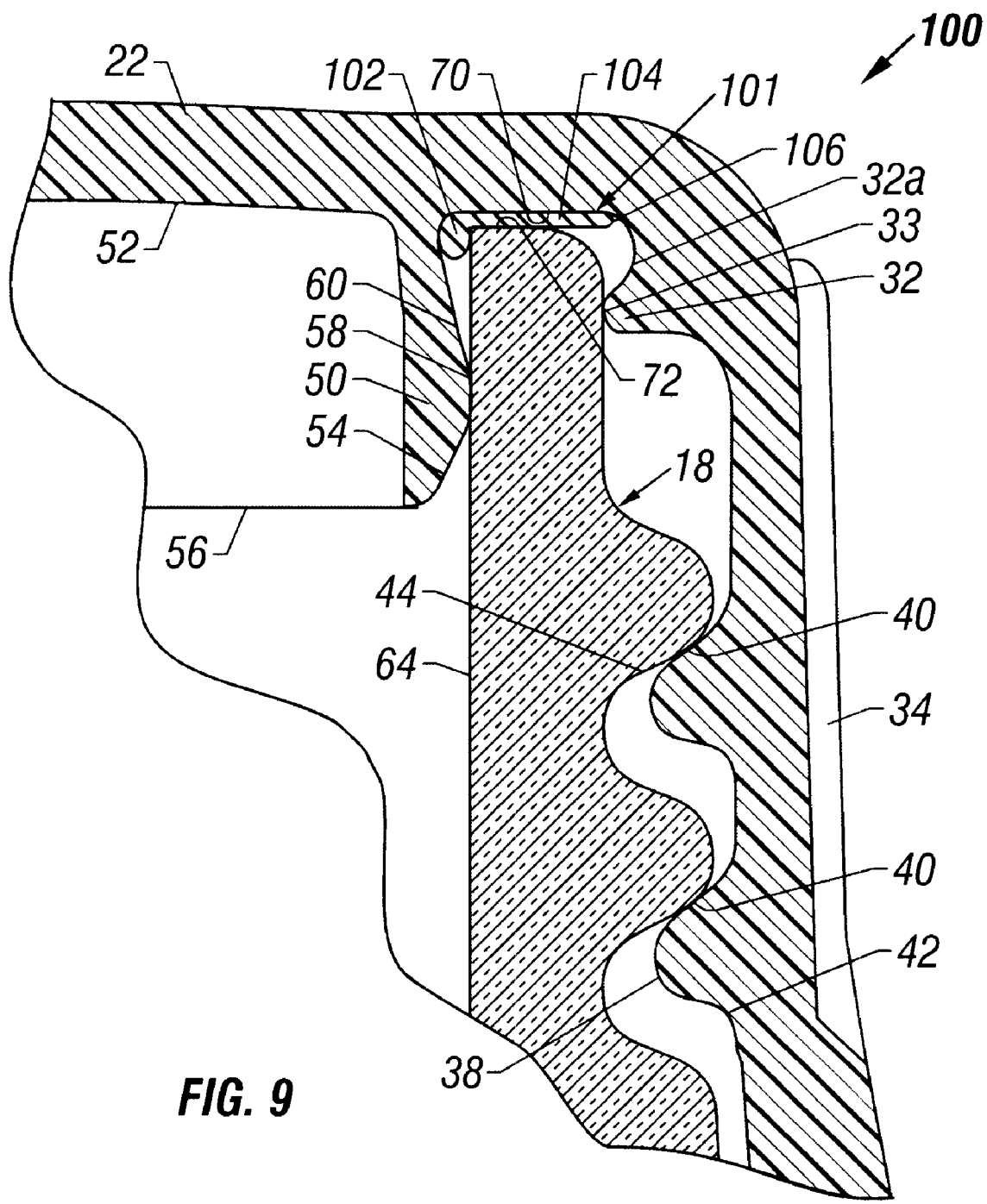
FIG. 9 is an enlarged cross sectional view of a container closure according to a further embodiment of the invention mounted on the neck of a container.

With reference now to FIG. 9, an closure 100 according to a further embodiment of the invention is illustrated, wherein like parts in the previous embodiment are represented by like numerals. As shown, the closure 100 includes a gas barrier seal 101 that fits against the lower surface 70 of the upper wall 22 between the inner annular seal 50 and the skirt inner surface 28.

Figure 10:
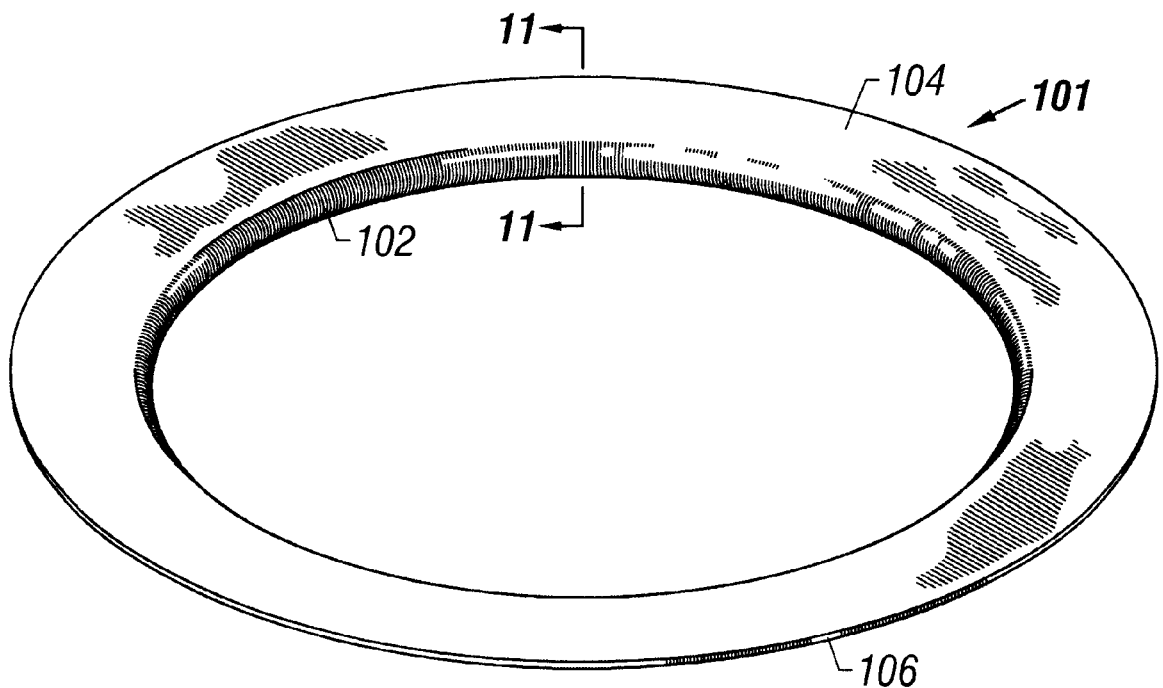
FIG. 10 is a perspective view of a gas barrier seal having an annular sealing bead and an upper annular seal integrally formed as a single piece in accordance with the embodiment of the invention of FIG. 9.
Figure 11:
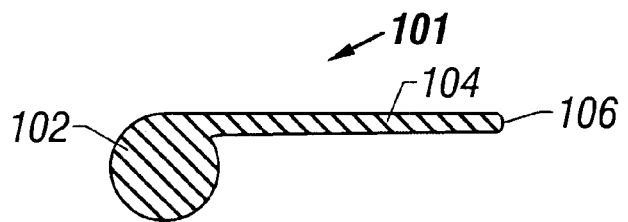
FIG. 11 is an enlarged cross sectional view of the gas barrier seal taken along line 11—11 of FIG. 10.

With additional reference to FIGS. 10 and 11, the gas barrier seal 101 comprises a annular sealing bead 102 and an annular sealing flange 104 that extends radially outwardly from the annular sealing bead 102. The annular sealing flange 104 is adapted to sealingly engage the upper edge 72 of the neck portion 14 when the closure is completely installed on the container. The annular sealing flange 104 has an outside edge 106 near the skirt inner surface 28. Preferably, the outside edge 106 is located between an upper surface 32a of the outer annular seal 32 and the lower surface 52 of the upper wall 22, while the annular sealing bead 102 is located between the apex 58 of the inner annular seal 50 and the lower surface 52 of the upper wall 22. Preferably, outside edge 106 is wedged between the upper surface 32a of the outer annular seal and the lower surface 52, while the annular sealing bead is wedged between the downwardly sloped surface 60 of the inner annular seal 50 and the lower surface 52. In this manner, the gas barrier seal 101 is held by the outer annular seal 32 and the inner annular seal 50 in sealing engagement with the lower surface 52 of the upper wall 22. Preferably, the annular sealing bead 102 and the annular sealing flange 104 are integrally formed as a unitary structure during molding or other forming process.

The annular sealing bead 102 and the sealing flange 104 are preferably constructed of an elastomer material, such as polyurethane or rubber, but may alternatively be formed of a relatively flexible plastic material, such as polyvinyl chloride, or other material that serves as a gas barrier between the contents of the container 12 and the closure 10. This is especially advantageous for yeast-based beverages and other naturally carbonated beverages and the like that tend to pressurize the container. The elastomer material provides for a positive seal even in the event of the deformation of the closure resulting from the repeated removal and reinstallation of the closure on the container. In yet a further embodiment of the invention, the annular sealing bead 102 and sealing flange 104 can be constructed of an oxygen absorbing material of the organic or inorganic type.

Four annular seals (besides the sealing engagement between the internal and external threads) are provided by the inner annular seal 50, the outer annular seal 32, the annular sealing bead 102, and the annular sealing flange 104, assuring that the contents of the container will remain sealed within the container in the event of the failure of one or two annular seals. The integrally-formed gas barrier seal 101 may be formed separately and installed in the closure 10 or formed at the same time as the closure 10, through injection molding, although other known forming processes may be used.

Figure 12:
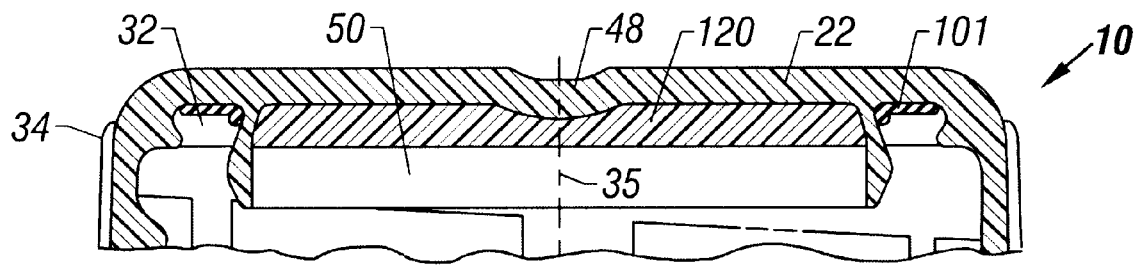
FIG. 12 is an enlarged cross sectional view of a container closure incorporating an oxygen absorbing layer in accordance with a further embodiment of the invention.

With reference now to FIG. 12, an oxygen absorbing liner 120 is secured to the upper wall 22 of the closure 10 within the confines of the inner annular seal 50. The oxygen absorbing liner is preferably disk-shaped and can be used in conjunction with the gas barrier seal 101 as shown, or alternatively may be used without the seal 101. The oxygen absorbing liner is preferably constructed of a material that is non-reactive to the contents of the container. The oxygen absorbing liner 120 can be formed in a manner as described in U.S. Pat. No. 5,143,763 to Yamada et al. or U.S. Pat. No. 5,839,593 to McKedy et al., the disclosures of which are hereby incorporated by reference. With this construction, the oxygen absorbing liner removes oxygen from inside the container to thereby improve storage life and/or reduce spoilage of the container contents.

Figure 13:
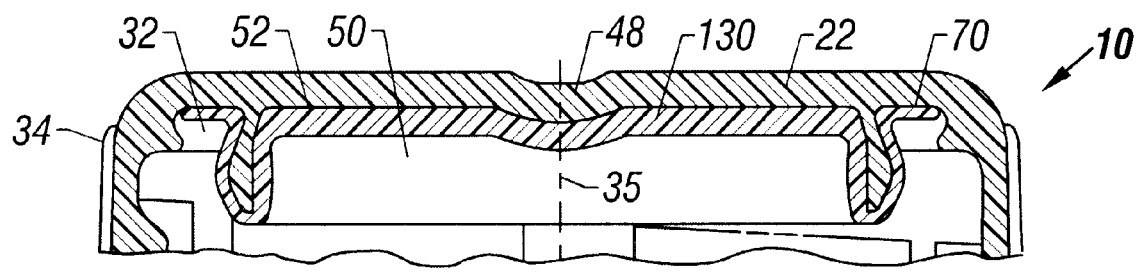
FIG. 13 is an enlarged cross sectional view of a container closure incorporating a modified oxygen absorbing layer according to a further embodiment of the invention.

With reference now to FIG. 13, an oxygen absorbing liner 130 is connected to the upper wall 22 of the closure 10. As shown, the oxygen absorbing liner 130 is shaped to cover the entire upper wall 22, including lower surfaces 52 and 70, as well as the inner annular seal 50. The oxygen absorbing liner can also be used as a gas barrier seal, and thus may have one or more layers of oxygen absorbing material and gas barrier material.

The oxygen absorbing liner in each of the above-described embodiments is preferably formed during injection molding of the closure by injecting the oxygen absorbing material and, if included, the gas barrier material onto the closure just after its formation during the molding cycle. Alternatively, the oxygen absorbing liner can be separately formed and mechanically or adhesively secured to the upper wall 22, or otherwise formed on the upper wall and/or inner annular seal such as through spray coating, dipping or the like.

With reference again to FIG. 1, a capping operation wherein the closure 10 is secured on the neck portion 14 of the container 12 will now be described. Initially, the closure 10 is aligned with the neck portion 14. As shown, the lower end of the skirt 24 may be slightly flared to facilitate alignment. The closure 10 is lowered into contact with the neck portion 14. The retaining tabs 88 (now extending perpendicular to or forming an acute angle with the annular wall 86) will contact the external thread 18 and annular shoulder 20 of the neck portion 14 and flex to a position 88A. As the outer free end 94 of the retaining tabs 88 clear the shoulder 20, they will spring back to a position 88B wherein the outer free end is in contact with the outer surface 16 of the neck portion 14. Depending on the original orientation of the retaining tabs 88, a biasing force may be created against the outer surface 16. As the internal closure thread 30 engages the external container thread 18 during the capping operation, the upward sloped surface 54 of the inner annular seal 50 will contact the upper edge 72 of the neck portion 14 and deform the outer annular seal radially inwardly until the apex 58 of the outer annular seal contacts the inner surface 64 of the neck portion to thereby bias the outer and inner annular seals against the neck portion. As the closure is twisted further onto the neck portion, the upper annular seal 70 will seat against the upper edge 72 with the upper surface 40 of the internal thread 30 in sealing contact with the lower surface 44 of the outer thread 18.

Alternatively, according to the embodiment shown in FIGS. 9 and 12, as the closure is twisted further onto the neck portion, the annular sealing flange 104 will seat against both the upper edge 72 and the lower surface 52 of the upper wall 22, with the upper surface 40 of the internal thread 30 in sealing contact with the lower surface 44 of the outer thread 18. The embodiment of FIG. 13 will operate in a similar manner.

According to either the embodiment of FIG. 1 or the embodiment of FIG. 9, any attempt to remove the closure 10 from the container 12 will cause the retaining tabs 88 to contact the annular shoulder 20 and break the ribs 82 (FIG. 4) to thereby separate the closure 10 from the security ring 26.

Although the closure has been shown and described in a particular orientation, it is to be understood that the invention is not limited thereto. The closure may be connectable to a bottle or other container in any orientation. Accordingly, the terms upper, lower, upward, downward, and their respective derivatives and equivalent terms as may be used throughout the specification, including the claims, denote relative, rather than absolute positions or orientations.

While the invention has been taught with specific reference to the above-described embodiments, those skilled in the art will recognize that changes can be made in form and detail without departing from the spirit and the scope of the invention. Thus, the described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A closure for connection to a container with a neck portion and an external helical thread formed on an outer surface of the neck portion, the closure comprising:
   an upper wall including a lower surface;
   a skirt formed integrally with and extending generally downwardly from the upper wall, the skirt having a skirt inner surface with an internal helical thread formed thereon for engaging the external helical thread of the neck portion to thereby secure the closure to the container;
   an inner annular seal extending generally axially downwardly from the upper wall to sealingly engage an inner surface of the neck portion, the inner annular seal having an inner seal apex area and a downwardly sloped surface extending generally downwardly and away from the upper wall to the inner seal apex area; and
   a gas barrier seal having an annular sealing bead positioned between the inner seal apex area and the upper wall inner surface for sealingly engaging the inner surface of the neck portion, with the downwardly sloped surface holding the annular sealing bead at least adjacent the lower surface of the upper wall, wherein the internal helical thread comprises:
   a crown spaced from the skirt inner surface;
   an upper thread surface extending generally upwardly and away from the crown to the skirt inner surface; and
   a lower thread surface extending generally downwardly and away from the crown to the skirt inner surface;
   wherein a cross sectional shape of the internal helical thread is asymmetrical with a length of the upper thread surface being greater than a length of the lower thread surface to thereby form an asymmetrical shape.

2. A closure for connection to a container with a neck portion, an annular shoulder and an external helical thread formed on an outer surface of the neck portion above the shoulder, the closure comprising:
   an upper wall including a lower surface;
   a skirt formed integrally with and extending generally downwardly from the upper wall, the skirt having a skirt inner surface with an internal helical thread formed thereon for engaging the external helical thread of the neck portion to thereby secure the closure to the container, the internal helical thread comprising:
   a crown spaced from the skirt inner surface;
   an upper thread surface extending generally upwardly and away from the crown to the skirt inner surface; and
   a lower thread surface extending generally downwardly and away from the crown to the skirt inner surface;
   a length of the upper thread surface being greater than a length of the lower thread surface to thereby form an asymmetrical cross sectional thread shape, the upper thread surface being adapted to sealingly engage a lower surface of the external helical thread when the closure is installed on the neck portion;
   an outer annular seal formed on the inner skirt surface and extending generally radially inwardly toward a central axis of the closure for sealingly engaging the outer surface of the neck portion, the outer annular seal including an upper surface;
   an inner annular seal extending generally axially downwardly from the upper wall to sealingly engage an inner surface of the neck portion, the inner annular seal having an inner seal apex area and a downwardly sloped surface, the downwardly sloped surface extending generally downwardly and away from the upper wall to the inner seal apex area;
   wherein a thickness of the neck portion between the inner and outer annular seals is greater than a distance between the inner and outer annular seals before installation of the closure on the container, with the outer annular seal exerting inward radial pressure on the outer surface of the neck portion and the inner annular seal exerting outward radial pressure on the inner surface of the neck portion when the closure is installed on the container;
   a gas barrier seal constructed of an elastomer material and comprising an annular sealing bead integrally formed with an annular sealing flange, the annular sealing flange extending generally radially outwardly from the annular sealing bead, the annular sealing bead being positioned between the inner seal apex area and the upper wall lower surface for sealingly engaging the inner surface of the neck portion, the downwardly sloped surface holding the annular sealing bead at least adjacent the lower surface of the upper wall, the annular sealing flange having an outside edge positioned near the skirt inner surface and above the upper surface of the outer annular seal, the upper surface of the outer annular seal being adapted to hold the annular sealing flange at least adjacent the lower surface of the upper wall; and a tamper-evident security ring connected to a lower end of the skirt, the security ring being adapted to contact the annular shoulder, the security ring comprising:
   an annular wall; and
   a plurality of circumferentially spaced retaining tabs, each retaining tab having a first end resiliently connected to the annular wall through an integral hinge and a second free end extending away from the integral hinge toward a central axis of the closure, whereby installation of the closure on the neck portion causes the retaining tabs to elastically deflect toward the annular wall when the second free ends pass by the shoulder, the second free ends being adapted to bias against the outer surface of the neck portion below the annular shoulder when the closure is installed on the neck portion.

* * * * *